United States Patent
Hasegawa

(10) Patent No.: US 11,121,630 B2
(45) Date of Patent: Sep. 14, 2021

(54) IN-VEHICLE DC-DC CONVERTER

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takeshi Hasegawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/970,400

(22) PCT Filed: Feb. 1, 2019

(86) PCT No.: PCT/JP2019/003576
§ 371 (c)(1),
(2) Date: Aug. 17, 2020

(87) PCT Pub. No.: WO2019/163479
PCT Pub. Date: Aug. 29, 2019

(65) Prior Publication Data
US 2021/0119539 A1    Apr. 22, 2021

(30) Foreign Application Priority Data

Feb. 22, 2018    (JP) .............................. JP2018-029489

(51) Int. Cl.
*H02M 3/158*    (2006.01)
*B60L 53/20*    (2019.01)
(Continued)

(52) U.S. Cl.
CPC ............. *H02M 3/158* (2013.01); *B60L 53/20* (2019.02); *H02M 1/08* (2013.01); *B60L 2210/10* (2013.01); *H02M 1/0009* (2021.05)

(58) Field of Classification Search
CPC ........................... H02M 3/158; H02M 1/0009
See application file for complete search history.

(56) References Cited

U.S. PATENT DOCUMENTS 9,419,522 B1 *    8/2016    Khaligh ............... H02M 3/1582
9,948,194 B2 *    4/2018    Higaki .................. H02M 1/083
(Continued)

FOREIGN PATENT DOCUMENTS

JP    2003-309997 A    10/2003
JP    6221851 B2    11/2017

OTHER PUBLICATIONS

International Search Report, Application No. PCT/JP2019/003576, dated Mar. 26, 2019. ISA/Japan Patent Office.

*Primary Examiner* — Adam D Houston
(74) *Attorney, Agent, or Firm* — Honigman LLP

(57) ABSTRACT

An in-vehicle DC-DC converter includes a gain setting unit that sets a gain to be used for feedback computation, a duty ratio determination unit that determines a duty ratio, and a drive unit that outputs, to a switching element, a PWM signal that is based on the duty ratio to be used determined by the duty ratio determination unit. The duty ratio determination unit includes a computation unit that repeatedly performs feedback computation for calculating a duty ratio of a PWM signal, so as to approximate a voltage value of an output-side conductive path to a target voltage value, based on a voltage value detected by the voltage detection unit and the gain to be used set by the gain setting unit. The gain setting unit sets the gain to be used, based on a voltage value detected by the voltage detection unit.

3 Claims, 5 Drawing Sheets

(51) Int. Cl.
  *H02M 1/08*      (2006.01)
  *H02M 1/00*      (2006.01)

(56)            References Cited

U.S. PATENT DOCUMENTS

| | | | |
|---|---|---|---|
| 10,511,161 B2* | 12/2019 | Katrak | H02H 5/04 |
| 2005/0254265 A1 | 11/2005 | Yamada | |
| 2006/0139979 A1* | 6/2006 | Song | H02J 7/34 |
| | | | 363/124 |
| 2007/0230228 A1* | 10/2007 | Mao | H02M 3/33592 |
| | | | 363/89 |
| 2009/0237042 A1* | 9/2009 | Glovinski | H02M 7/5387 |
| | | | 323/235 |
| 2010/0148739 A1* | 6/2010 | Khaligh | H02M 3/1582 |
| | | | 323/283 |
| 2012/0032517 A1* | 2/2012 | Ido | B60L 1/00 |
| | | | 307/77 |
| 2015/0046001 A1* | 2/2015 | Park | B60L 3/0046 |
| | | | 701/22 |
| 2015/0097527 A1* | 4/2015 | DeDona | B60L 58/20 |
| | | | 320/109 |
| 2015/0303815 A1* | 10/2015 | Chen | H02M 3/158 |
| | | | 363/21.04 |
| 2015/0372606 A1* | 12/2015 | Tamura | H02M 3/33584 |
| | | | 363/21.04 |
| 2017/0253127 A1* | 9/2017 | Ciaccio | B60L 3/0046 |
| 2017/0253231 A1* | 9/2017 | Ciaccio | H01M 10/44 |
| 2017/0353111 A1* | 12/2017 | Elasser | H02M 3/33584 |
| 2019/0214911 A1* | 7/2019 | Hashiguchi | B60R 16/033 |
| 2019/0280595 A1* | 9/2019 | Yabuta | B60L 1/14 |
| 2019/0296643 A1* | 9/2019 | Li | H02J 1/102 |
| 2020/0076306 A1* | 3/2020 | Pullen | H02M 3/1582 |
| 2020/0298722 A1* | 9/2020 | Smolenaers | B60L 53/24 |
| 2021/0016671 A1* | 1/2021 | Suzuki | B60L 58/25 |
| 2021/0083583 A1* | 3/2021 | Becker | H02M 3/1584 |
| 2021/0086660 A1* | 3/2021 | Verdier | B60L 58/12 |
| 2021/0119539 A1* | 4/2021 | Hasegawa | H02M 3/155 |
| 2021/0152085 A1* | 5/2021 | Kawata | H05B 45/20 |

* cited by examiner

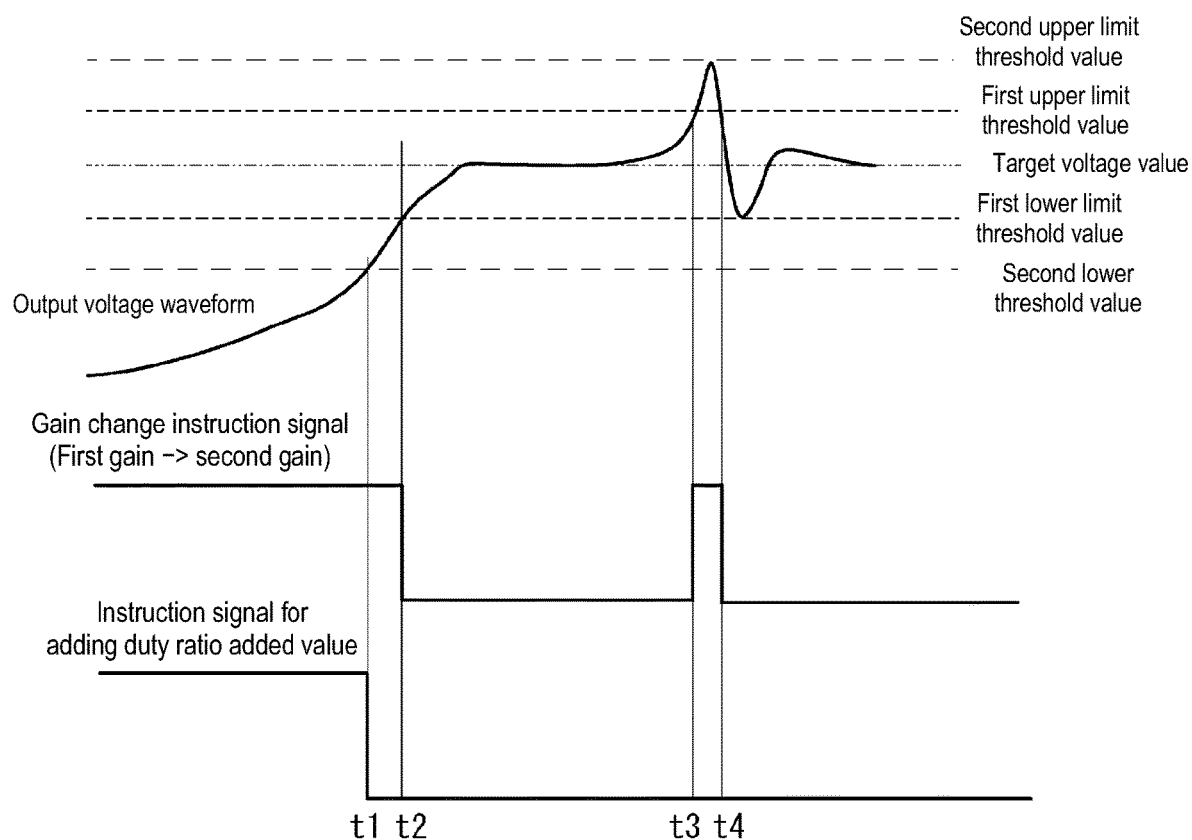

IN-VEHICLE DC-DC CONVERTER

CROSS-REFERENCE TO RELATED APPLICATIONS

This application is the U.S. national stage of PCT/JP2019/003576 filed on Feb. 1, 2019, which claims priority of Japanese Patent Application No. JP 2018-029489 filed on Feb. 22, 2018, the contents of which are incorporated herein.

TECHNICAL FIELD

The present disclosure relates to an in-vehicle DC-DC converter.

BACKGROUND

JP-6221851B discloses an example of a voltage conversion apparatus. This voltage conversion apparatus functions as a step-up DC-DC converter, and the control unit thereof is provided with a feedback computation unit, a feedforward computation unit, and a gain selection unit. The gain selection unit stores, as a matrix, a plurality of pairs of candidate gains consisting of combinations of a proportional gain and an integral gain, and functions so as to compute evaluation functions indicating change amounts of a system voltage, for two or more pairs of candidate gains, and set a candidate gain for which the evaluation function is the smallest, as a feedback gain.

Incidentally, in an in-vehicle DC-DC converter of this type, the degree to which a gain to be used for feedback computation is set is an important issue. For example, if a large gain is set, and an output voltage value deviates from a target voltage value largely (for example, immediately after start up), then the output voltage value can be increased more quickly and brought to the target voltage value, but there is a problem in that overshoot increases after the output voltage value has reached the target voltage value. Conversely, if the gain is set small, overshoot can be suppressed, but if the output voltage value deviates from the target voltage value largely, there is a problem in that it takes a long time for the output voltage value to approximate the target voltage value. In this manner, a desirable gain when the output voltage value deviates from the target voltage value and a desirable gain when the output voltage value is close to the target voltage value are different, but in conventional in-vehicle DC-DC converters, it has not been possible to switch a gain based on an output voltage value.

The present disclosure has been made in order to solve at least one of the above-described issues, and aims to provide an in-vehicle DC-DC converter in which, when a voltage conversion unit is performing voltage conversion, a switch can be made to a gain that is based on an output voltage value during the voltage conversion.

SUMMARY

An in-vehicle DC-DC converter according to one aspect of the present disclosure is an in-vehicle DC-DC converter that is electrically connected to a first conductive path and a second conductive path, one of the first conductive path and the second conductive path being defined as an input-side conductive path and the other being defined as an output-side conductive path, steps up or down a voltage applied to the input-side conductive path, and outputs the voltage to the output-side conductive path. The in-vehicle DC-DC converter includes a voltage conversion unit that includes a switching element that performs an on/off operation in accordance with being supplied with a PWM signal, the voltage conversion unit stepping up or down a voltage applied to the input-side conductive path, through an on/off operation by the switching element, and outputting the voltage to the output-side conductive path. A voltage detection unit detects a voltage value of the output-side conductive path. A gain setting unit sets a gain to be used for feedback computation. A duty ratio determination unit includes a computation unit that repeatedly performs feedback computation for calculating a duty ratio of the PWM signal so as to approximate a voltage value of the output-side conductive path to a target voltage value based on at least a voltage value detected by the voltage detection unit and the gain to be used set by the gain setting unit, and, every time the computation unit performs feedback computation, determines a duty ratio to be used, based on a calculated duty ratio calculated through the feedback computation; and a drive unit that outputs, to the switching element, a PWM signal that is based on the duty ratio to be used determined by the duty ratio determination unit, and the gain setting unit sets the gain to be used, based on a voltage value detected by the voltage detection unit.

Advantageous Effects of Disclosure

The above-described in-vehicle DC-DC converter can set a gain to be used, based on a voltage value detected by the voltage detection unit, and thus can perform feedback computation using a gain that is based on an output voltage value when the voltage conversion unit is actually performing voltage conversion.

BRIEF DESCRIPTION OF DRAWINGS

FIG. 5 is an explanatory diagram explaining the relationship between an output voltage waveform and output timings of a gain change instruction signal and an instruction signal for adding a duty ratio added value.

DETAILED DESCRIPTION OF PREFERRED EMBODIMENTS

Figure 1:
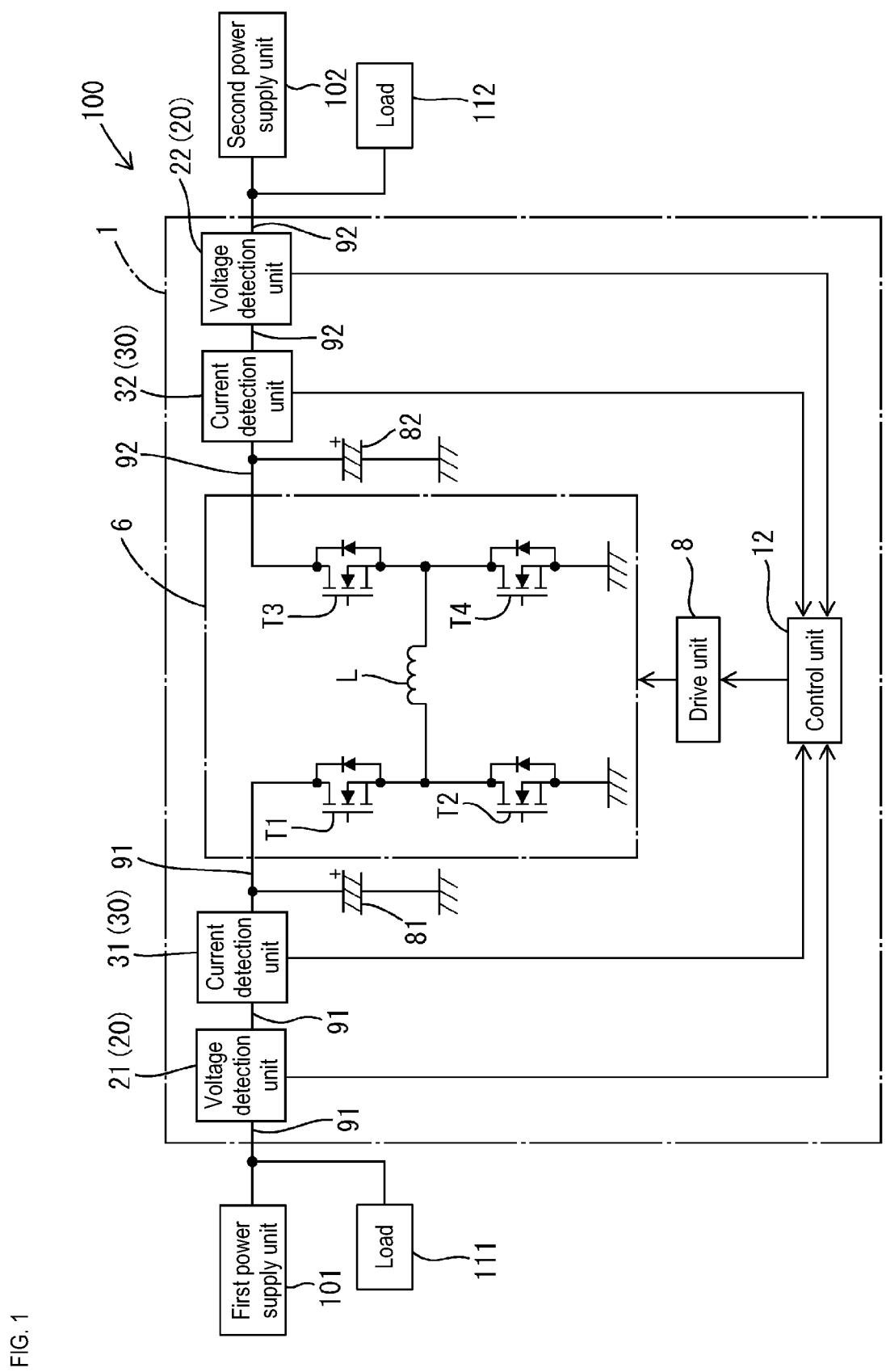
FIG. 1 is a circuit diagram schematically illustrating an in-vehicle power supply system provided with an in-vehicle DC-DC converter according to a first embodiment.

A preferred embodiment of the present disclosure will be described below.

The gain setting unit may be configured to, when a difference between a voltage value detected by the voltage detection unit and the target voltage value is smaller than a predetermined threshold value, set a first gain as the gain to be used, and, when the difference between the voltage value detected by the voltage detection unit and the target voltage value is larger than or equal to the predetermined threshold value, set a second gain that is larger than the first gain, as the gain to be used.

When the voltage conversion unit is actually performing voltage conversion, if the output voltage value and the target voltage value differ to a certain degree or larger, the in-vehicle DC-DC converter configured as described above can increase the speed at which the difference between the output voltage value and the target voltage value is decreased, by performing feedback computation using the relatively large second gain, and approximate the output voltage value to the target voltage value faster. On the other hand, if the output voltage value and the target voltage value differ to a degree smaller than the certain degree, the in-vehicle DC-DC converter can approximate the output voltage value to the target voltage value while suppressing overshoot and undershoot, by performing feedback computation using the relatively small first gain.

The duty ratio determination unit may be configured to, when the computation unit performs feedback computation, if the difference between the voltage value detected by the voltage detection unit and the target voltage value is larger than or equal to a second threshold value that is larger than the predetermined threshold value, determines a duty ratio to be used, by adding an added value obtained through predetermined addition processing to the calculated duty ratio calculated through feedback computation that is based on the second gain, and, if the difference between the voltage value detected by the voltage detection unit and the target voltage value is larger than or equal to the predetermined threshold value and smaller than the second threshold value, determine the calculated duty ratio calculated through feedback computation that is based on the second gain, as the duty ratio to be used.

If the difference between the output voltage value and the target voltage value is larger (larger than or equal to the second threshold value), the in-vehicle DC-DC converter configured as described above can use, in parallel, an operation of performing feedback computation using the relatively large second gain, and an operation of adding an added value (a value obtained through predetermined addition processing) to a duty ratio and increasing the duty ratio. That is to say, if the difference between the output voltage value and the target voltage value is larger, it is possible to further increase the speed at which the difference between the output voltage value and the target voltage value is decreased.

First Embodiment

A first embodiment of the present disclosure will be described below.

A DC-DC converter 1 shown in FIG. 1 is configured as an in-vehicle step up/down DC-DC converter, for example, and steps up or down a DC voltage applied to one of a first conductive path 91 and a second conductive path 92, and outputs the voltage to the other conductive path.

The DC-DC converter 1 includes the first conductive path 91 and the second conductive path 92, which are power lines. The first conductive path 91 is electrically connected to a high-potential terminal of a first power supply unit 101 provided as a high-voltage power supply unit, and is electrically continuous with this high-potential terminal. A configuration is adopted in which the first power supply unit 101 applies a predetermined DC voltage to the first conductive path 91. The second conductive path 92 is electrically connected to a high-potential terminal of a second power supply unit 102 provided as a low-voltage power supply unit, and is electrically continuous with this high-potential terminal. A configuration is adopted in which the second power supply unit 102 applies a predetermined DC voltage to the second conductive path 92.

Each of the first power supply unit 101 and the second power supply unit 102 is constituted by a known power storage means, such as a lead storage battery, a lithium-ion battery, an electric double-layer capacitor, a lithium-ion capacitor, or another power storage unit. An output voltage of the first power supply unit 101 should be higher than an output voltage of the second power supply unit 102, and these output voltages are not particularly limited to specific values. Low-potential terminals of the first power supply unit 101 and the second power supply unit 102 are electrically connected to a grounding unit (not illustrated), and kept at a predetermined ground potential (0 V).

An in-vehicle load 111 is electrically connected to the first conductive path 91 electrically connected to the first power supply unit 101, and is configured to be supplied with power from the first power supply unit 101. An in-vehicle load 112 is electrically connected to the second conductive path 92 electrically connected to the second power supply unit 102, and is configured to be supplied with power from the second power supply unit 102. The in-vehicle loads 111 and 112 are known in-vehicle electrical components, and the types of the in-vehicle loads 111 and 112 are not particularly limited.

A voltage conversion unit 6 has a function of stepping up or down a voltage input through on/off operations of switching elements T1, T2, T3, and T4, and outputting the voltage. The voltage conversion unit 6 is disposed between the first conductive path 91 and the second conductive path 92, and has a step-down function of performing a voltage step-down operation and a step-up function of performing a voltage step-up operation. The following describes an example where the voltage conversion unit 6 executes the step-down function of stepping down a voltage applied to the first conductive path 91 and outputting the voltage to the second conductive path 92, and the step-up function of stepping up a voltage applied to the second conductive path 92 and outputting the voltage to the first conductive path 91.

The voltage conversion unit 6 includes the switching elements T1, T2, T3, and T4, which are arranged in an H-bridge configuration, and an inductor L, and functions as a so-called bidirectional DC-DC converter. Each of the switching elements T1, T2, T3, and T4 is configured as an N-channel MOSFET. The inductor L is configured as a known coil. Note that the first conductive path 91 is electrically connected to one of the electrodes of a capacitor 81, and the other electrode of the capacitor 81 is electrically connected to the ground. The second conductive path 92 is electrically connected to one of the electrodes of a capacitor 82, and the other electrode of the capacitor 82 is electrically connected to the ground.

In the voltage conversion unit 6, the drain of the switching element T1 is electrically connected to the first conductive path 91, and the source of the switching element T1 is electrically connected to the drain of the switching element T2 and one end of the inductor L. The drain of the switching element T3 is electrically connected to the second conductive path 92, and the source of the switching element T3 is electrically connected to the drain of the switching element T4 and to the other end of the inductor L. The sources of the switching elements T2 and T4 are electrically connected to the ground. Signals from a drive unit 8 to be described later are input to respective gates of the switching elements T1, T2, T3, and T4.

A voltage detection unit 20 includes voltage detection units 21 and 22. Each of the voltage detection units 21 and 22 is configured as a known voltage detection circuit. The voltage detection unit 21 inputs, to a control unit 12, a value indicating the voltage of the first conductive path 91 (e.g., the voltage value of the first conductive path 91 or a value obtained by dividing the voltage value of the first conductive path 91 using a voltage division circuit) as a detected value. The voltage detection unit 22 inputs, to the control unit 12, a value indicating the voltage of the first conductive path 92 (e.g., the voltage value of the second conductive path 92 or a value obtained by dividing the voltage value of the second conductive path 92 using a voltage division circuit) as a detected value. The control unit 12 can specify the voltage value of the first conductive path 91 based on the value input from the voltage detection unit 21 (value detected by the voltage detection unit 21), and can specify the voltage value of the second conductive path 92 based on the value input from the voltage detection unit 22 (value detected by the voltage detection unit 22).

A current detection unit 30 includes current detection units 31 and 32. Each of the current detection units 31 and 32 is configured as a known current detection circuit. The current detection unit 31 is a current detection circuit that detects a current flowing through the first conductive path 91, and is constituted by, for example, a shunt resistor disposed in the first conductive path 91 and a differential amplifier that amplifies and outputs voltages at the two ends of the shunt resistor. The current detection unit 32 is a current detection circuit that detects a current flowing through the second conductive path 92, and is constituted by, for example, a shunt resistor disposed in the second conductive path 92 and a differential amplifier that amplifies and outputs voltages at the two ends of the shunt resistor. The control unit 12 specifies the value of a current flowing through the first conductive path 91 based on a value input from the current detection unit 31 (value detected by the current detection unit 31), and specifies the value of a current flowing through the second conductive path 92 based on a value input from the current detection unit 32 (value detected by the current detection unit 32).

The control unit 12 is configured as a microcomputer, for example, and performs feedback control based on a voltage value input from the voltage detection unit 20, a current value input from the current detection unit 30, and a target voltage value, using a known method, and the control unit 12 sets a duty ratio of a PWM signal to be provided to the voltage conversion unit 6. The control unit 12 then outputs a PWM signal with the set duty ratio, to the drive unit 8. The target voltage value may be a value set by the control unit 12, or may also be a value designated by an external apparatus, such as an external ECU.

The drive unit 8 is a circuit that outputs a control signal for switching on or off the switching elements T1, T2, T3, and T4. This drive unit 8 has a function of outputting, to the voltage conversion unit 6, a PWM signal with a duty ratio set by the control unit 12.

In a step-down mode, as a result of the control unit 12 and the drive unit 8 operating, synchronous rectification control is performed so as to output PWM signals with dead times respectively set for the gates of the switching elements T1 and T2 in a complementary manner. Specifically, the synchronous rectification control is performed such that, while an ON signal (e.g., an H-level signal) is output to the switching element T1, an OFF signal (e.g., an L-level signal) is output to the switching element T2, and, while an ON signal (e.g., an H-level signal) is output to the switching element T2, an OFF signal (e.g., an L-level signal) is output to the switching element T1. Due to this control, an operation of stepping down a DC voltage (input voltage) applied to the first conductive path 91 is performed, and an output voltage that is lower than the input voltage applied to the first conductive path 91 is applied to the second conductive path 92. The output voltage that is applied to the second conductive path 92 is determined according to the duty ratio of the PWM signal provided to the gate of the switching element T1. Note that, in the step-down mode, an ON signal is continuously input to the gate of the switching element T3, and the switching element T3 is maintained in an ON state. In addition, an OFF signal is continuously input to the gate of the switching element T4, and the switching element T4 is maintained in an OFF state.

In the step-down mode, the control unit 12 performs feedback control of a known method. Specifically, a computation unit 49 that constitutes a part of the control unit 12 cyclically repeats feedback computation for calculating a duty ratio of a PWM signal (control signal) so as to approximate a voltage of the second conductive path 92 (output-side conductive path in the step-down mode) to the target voltage value, based on an output voltage detected by the voltage detection unit 22 (output voltage detection unit in the step-down mode). In cyclically executed feedback computation, known feedback computation processing such as PID computation or PI computation is performed based on a deviation between the output voltage value and the target voltage value, and a new duty ratio for approximating the output voltage value to the target voltage value is determined. The control unit 12 continuously outputs a PWM signal (control signal) in the step-down mode, and every time the computation unit 49 performs feedback computation, changes the duty ratio of the PWM signal (control signal) to a new duty ratio obtained through the feedback computation. The drive unit 8 obtains a PWM signal provided from the control unit 12, and outputs a PWM signal having the same cycle and duty ratio as those of the obtained PWM signal, to the gate of the switching element T1. The PWM signal that is output from the drive unit 8 to the gate of the switching element T1 is adjusted to an appropriate level at which the voltage of an ON signal (H-level signal) can cause the switching element T1 to turn on. The drive unit 8 then outputs, to the gate of the switching element T2, a PWM signal complementary to the PWM signal output to the gate of the switching element T1, and the synchronous rectification control is performed.

Note that, in the step-down mode, the first conductive path 91 corresponds to an example of an input-side conductive path, and the second conductive path 92 corresponds to an example of an output-side conductive path.

In a step-up mode, as a result of the control unit 12 and the drive unit 8 operating, synchronous rectification control is performed so as to output PWM signals with dead times respectively set for the gates of the switching elements T1 and T2 in a complementary manner. Specifically, the synchronous rectification control is performed such that, while an ON signal (e.g., an H-level signal) is output to the switching element T2, an OFF signal (e.g., an L-level signal) is output to the switching element T1, and, while an ON signal (e.g., an H-level signal) is output to the switching element T1, an OFF signal (e.g., an L-level signal) is output to the switching element T2. Due to this control, an operation of stepping up a DC voltage (input voltage) applied to the second conductive path 92 is performed, and an output voltage that is higher than the input voltage applied to the second conductive path 92 is applied to the first conductive path 91. The output voltage that is applied to the first conductive path 91 is determined according to the duty ratio of the PWM signal provided to the gate of the switching element T2. Note that, in the step-up mode, an ON signal is continuously input to the gate of the switching element T3, and the switching element T3 is maintained in an ON state. In addition, an OFF signal is continuously input to the gate of the switching element T4, and the switching element T4 is maintained in an OFF state.

In the step-up mode, the control unit 12 performs feedback control of a known method. Specifically, the computation unit 49 that constitutes a part of the control unit 12 cyclically repeats feedback computation for calculating a duty ratio of a PWM signal (control signal) so as to approximate a voltage of the first conductive path 91 (output-side conductive path in the step-up mode) to the target voltage value, based on an output voltage detected by the voltage detection unit 21 (output voltage detection unit in the step-up mode). The feedback computation can be performed in the same manner as in the step-down mode. The control unit 12 continuously outputs a PWM signal (control signal) in the step-up mode, and every time the computation unit 45 performs feedback computation, changes the duty ratio of the PWM signal (control signal) to a new duty ratio obtained through the feedback computation. The drive unit 8 obtains the PWM signal provided from the control unit 12 and outputs a PWM signal having the same cycle and duty ratio as those of the obtained PWM signal, to the gate of the switching element T2. The PWM signal that is output from the drive unit 8 to the gate of the switching element T2 is adjusted to an appropriate level at which the voltage of an ON signal (H-level signal) can cause the switching element T2 to turn on. The drive unit 8 then outputs, to the gate of the switching element T1, a PWM signal complementary to the PWM signal output to the gate of the switching element T2, and the synchronous rectification control is performed.

Noted that, in the step-up mode, the second conductive path 92 corresponds to an example of an input-side conductive path, and the first conductive path 91 corresponds to an example of an output-side conductive path.

Figure 2:
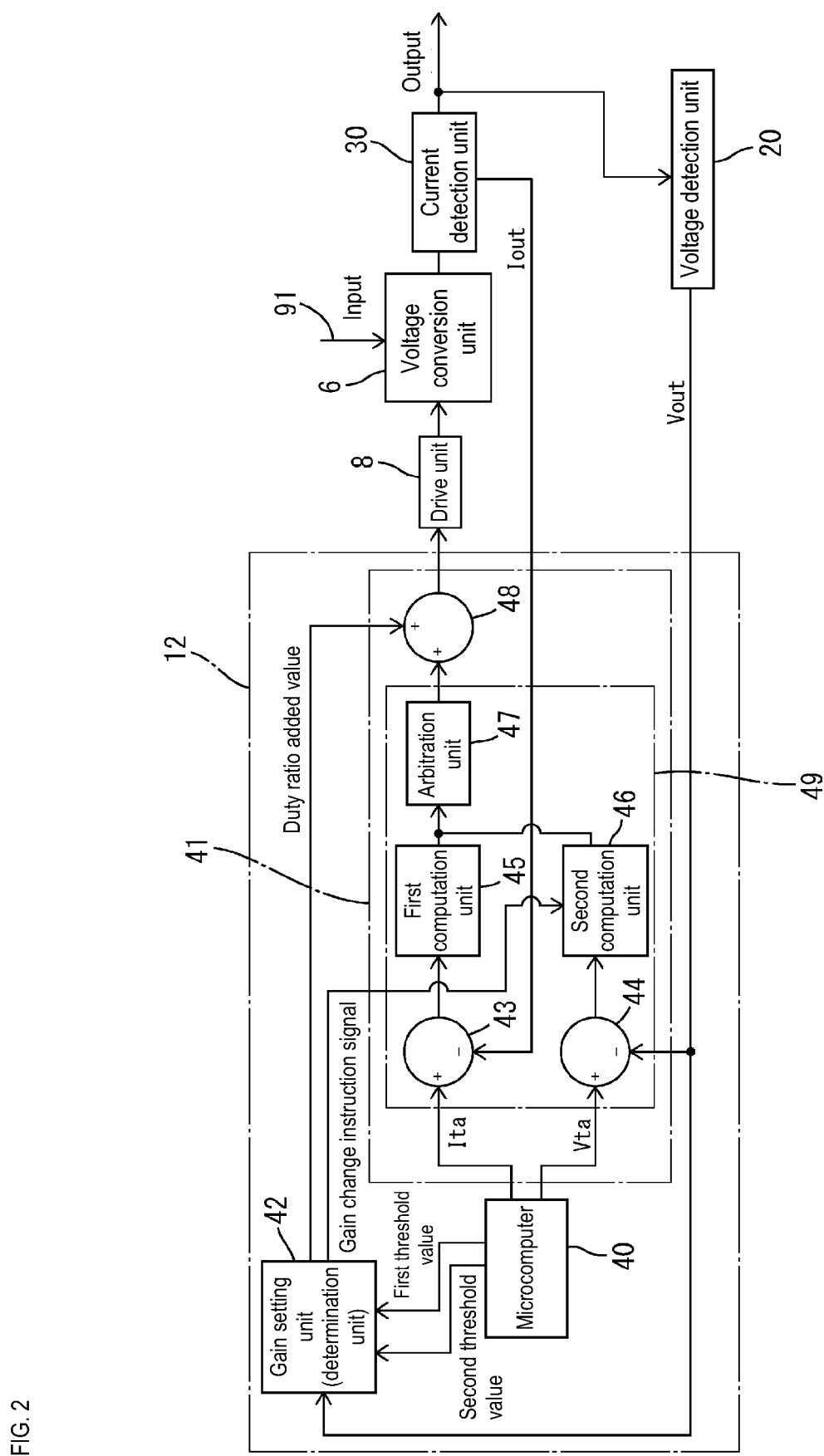
FIG. 2 is a block diagram illustrating a control unit and the like of the DC-DC converter of the first embodiment in detail.

As shown in FIG. 2, the control unit 12 mainly includes a microcomputer 40, a duty ratio determination unit 41, and a gain setting unit 42, for example.

The microcomputer 40 includes a CPU, a ROM, a RAM, a non-volatile memory, and the like. The microcomputer 40 stores the value of a gain to be used for feedback computation, threshold values (a first upper limit threshold value, a first lower limit threshold value, a second upper limit threshold value, and a second lower limit threshold value) to be used for determining the magnitude of an output voltage value Vout, a program for calculating a duty ratio added value, and the like.

The duty ratio determination unit 41 is a circuit that performs feedback computation such that output from the voltage conversion unit 6 reaches a set target value, and determines a duty ratio of a PWM signal. In the step-down mode, a control amount (duty ratio) is determined through feedback computation of a known PI control method, based on a current value Iout and the voltage value Vout of the second conductive path 92, a target value of an output current (target current value) Ita, and a target value of an output voltage (target voltage value) Vta, for example. The duty ratio determination unit 41 then outputs a PWM signal with the determined duty ratio to the voltage conversion unit 6.

The gain setting unit 42 functions as a determination unit, and also functions so as to set a gain to be used for feedback computation based on a voltage value detected by the voltage detection unit 20. Specifically, if a difference ΔV between the output voltage value Vout detected by the voltage detection unit 20 and the target voltage value Vta is smaller than a predetermined threshold value (first threshold value), the gain setting unit 42 sets a first gain as a gain to be used, and if the difference ΔV between the output voltage value Vout detected by the voltage detection unit 20 and the target voltage value Vta is larger than or equal to the predetermined threshold value (first threshold value), sets a second gain that is larger than the first gain, as a gain to be used. The "difference ΔV between the output voltage value Vout and the target voltage value Vta" is the absolute value of the value obtained by subtracting the output voltage value Vout from the target voltage value Vta (Vta−Vout).

Furthermore, with this configuration, the gain setting unit 42 and an addition unit 48 can respectively generate and add an added value (increment). Specifically, if the difference ΔV between the output voltage value Vout detected by the voltage detection unit 20 and the target voltage value Vta is larger than or equal to a second threshold value that is larger than the predetermined threshold value (first threshold value), the gain setting unit 42 performs predetermined addition processing for calculating an added value. In this case, the addition unit 48 sets, as a duty ratio to be used, a value obtained by adding the added value calculated by the gain setting unit 42 to a calculated duty ratio calculated by the computation unit 49, and outputs a PWM signal with this duty ratio to be used. On the other hand, if the difference ΔV between the output voltage value Vout detected by the voltage detection unit 20 and the target voltage value Vta is smaller than the second threshold value, the addition unit 48 does not add the added value, and sets the calculated duty ratio calculated by the computation unit 49, as a duty ratio to be used, and outputs a PWM signal with this duty ratio to be used.

Feedback control that is performed by the control unit 12 will be described with reference to FIG. 3 and the like.

Figure 3:
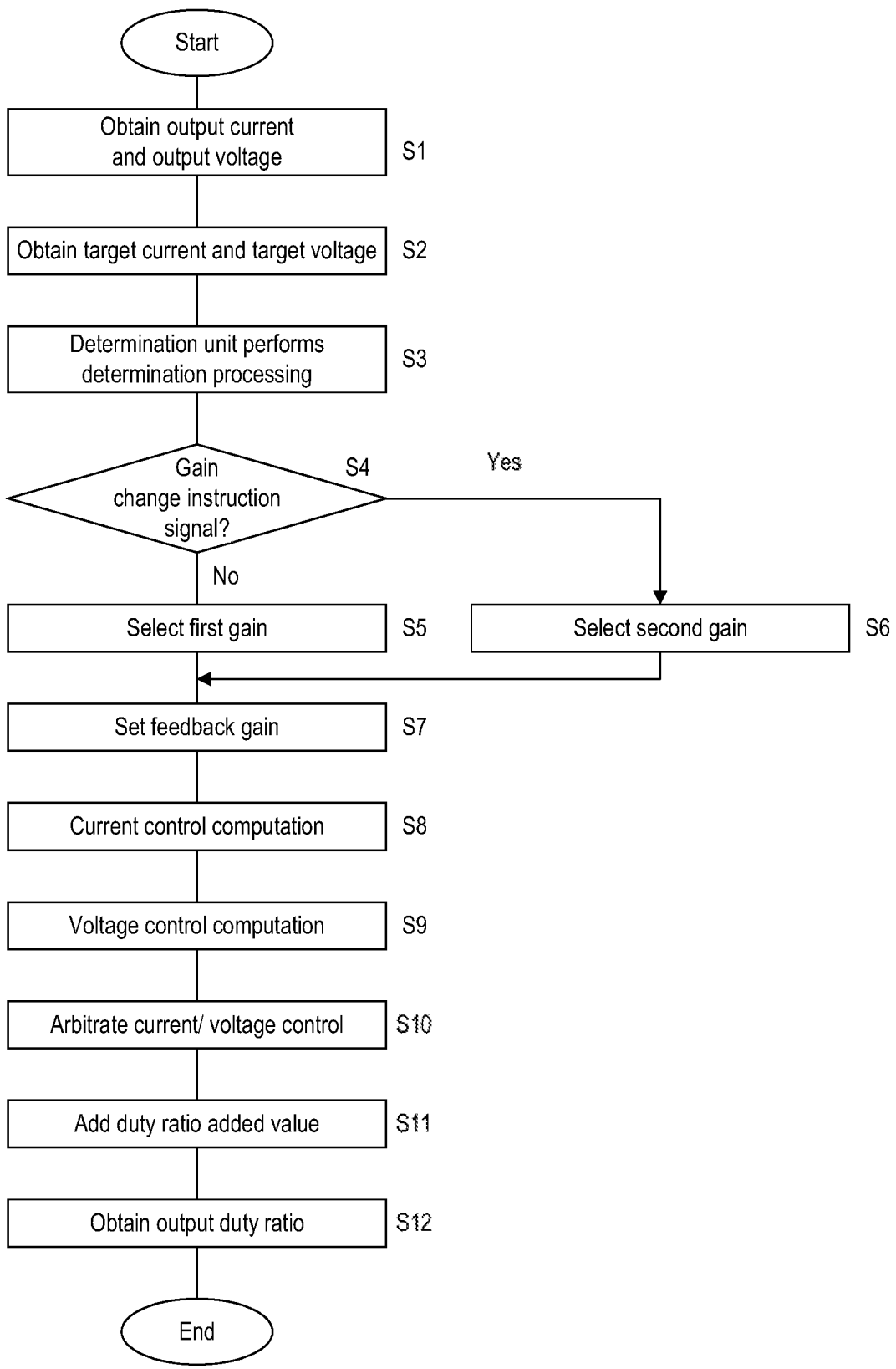
FIG. 3 is a flowchart illustrating a flow of feedback control that is performed by the DC-DC converter of the first embodiment.

The feedback control shown in FIG. 3 is control that is performed by the duty ratio determination unit 41, and is processing that is cyclically repeated at a short time interval. When a predetermined operation start condition is met, the duty ratio determination unit 41 performs control according to the flow shown in FIG. 3. The operation start condition refers to a switch of an ignition signal from off to on, for example, and another operation start condition may also be used. Note that feedback control to be described below can be applied in a similar manner when the voltage conversion unit 6 is operated in the step-down mode and the step-up mode.

First, the output current value Iout that is output from the current detection unit 30 and the output voltage value Vout that is output from the voltage detection unit 20 are obtained (step S1). If, for example, the processing in FIG. 3 is realized by the hardware circuit shown in FIG. 2, a deviation calculation circuit 43 obtains the output current value Iout, and a deviation calculation circuit 44 obtains the output voltage value Vout. Also, the deviation calculation circuit 43 obtains the target current value Ita that is set by the microcomputer 40, and the deviation calculation circuit 44 obtains the target voltage value Vta (step S2).

Note that, for example, a configuration may be adopted in which the microcomputer 40 sets the target current value Ita to a predetermined fixed current value, in a steady output state, and gradually increases the target current value Ita from 0 to the above fixed current value in accordance with a time that has elapsed, during soft start that is performed immediately after the DC-DC converter 1 has started to operate. Similarly, a configuration may be adopted in which the target voltage value Vta is set to a predetermined fixed voltage value, in the steady output state, and is gradually increased from 0 to the above fixed voltage value in accordance with a time that has elapsed, during soft start.

After step S2, the gain setting unit 42 (determination unit) performs determination processing in which the output voltage value Vout obtained in step S1 is used (step S3). This determination processing is performed according to the flow shown in FIG. 4. The gain setting unit 42 first obtains threshold values from the microcomputer 40 as the determination processing in step S3 starts (step S21). The threshold values that are obtained in step S21 are the first threshold value and the second threshold value. The first threshold value is the difference between the target voltage value and the first upper limit threshold value, and is also the difference between the target voltage value and the first lower limit threshold value. The first upper limit threshold value and the first lower limit threshold value are specified using this first threshold value. As shown in FIG. 5, the first upper limit threshold value is larger than the target voltage value Vta by the first threshold value (first predetermined value), and the first lower limit threshold value is smaller than the target voltage value Vta by the first threshold value (first predetermined value). The second threshold value is the difference between the target voltage value and the second upper limit threshold value, and is also the difference between the target voltage value and the second lower limit threshold value. The second upper limit threshold value and the second lower limit threshold value are specified using this second threshold value. The second upper limit threshold value is larger than the target voltage value Vta by the second threshold value (second predetermined value), and the second lower limit threshold value is smaller than the target voltage value Vta by the second threshold value (second predetermined value). The second threshold value (second predetermined value) is a value larger than the first threshold value (first predetermined value).

After step S21, the gain setting unit 42 obtains the output voltage value Vout (step S22). In step S22, the output voltage value Vout obtained and stored in step S1 is read out. After step S22, the gain setting unit 42 determines whether or not the output voltage value Vout obtained in step S22 is in the range of the first threshold value with respect to the target voltage value Vta, in other words whether or not the difference ΔV between that output voltage value Vout and the target voltage value Vta is smaller than the first threshold value (predetermined threshold value) (step S23). If the output voltage value Vout obtained in step S22 is smaller than the first upper limit threshold value and larger than the first lower limit threshold value, the gain setting unit 42 determines that the difference ΔV between the output voltage value Vout and the target voltage value Vta is smaller than the first threshold value (predetermined threshold value), and, in this case, outputs a gain change instruction signal so as to change the gain to be used, to the first gain (Y in step S23, step S24). During the period from time t2 to t3 or the period after time t4 in the output voltage waveform shown in FIG. 5, for example, the difference ΔV between the output voltage value Vout and the target voltage value Vta is smaller than the first threshold value, and thus the gain setting unit 42 outputs a gain change instruction signal so as to change the gain to be used, to the first gain. After step S24, the gain setting unit 42 ends the control in FIG. 4 without outputting an instruction signal for adding a duty ratio added value (step S25).

If it is determined, in step S23, that the difference ΔV between the output voltage value Vout and the target voltage value Vta is larger than or equal to the first threshold value (predetermined threshold value) (in other words, if the output voltage value Vout obtained in step S22 is larger than or equal to the first upper limit threshold value or is smaller than or equal to the first lower limit threshold value), the gain setting unit 42 determines whether or not the output voltage value Vout is in the range of the second threshold value with respect to the target voltage value Vta, in other words, whether or not the difference ΔV between the output voltage value Vout obtained in step S22 and the target voltage value Vta is smaller than the second threshold value (N in step S23, step S26). If the output voltage value Vout obtained in step S22 is smaller than the second upper limit threshold value and larger than the second lower limit threshold value, the gain setting unit 42 determines that the difference ΔV between the output voltage value Vout and the target voltage value Vta is smaller than the second threshold value, and, in this case, outputs a gain change instruction signal so as to change the gain to be used, to the second gain (Y in step S26, step S27). During the period from time t1 to t2 or the period from time t3 to t4 in the output voltage waveform shown in FIG. 5, for example, the difference ΔV between the output voltage value Vout and the target voltage value Vta is larger than or equal to the first threshold value and smaller than the second threshold value, and thus outputs a gain change instruction signal so as to change the gain to be used, to the second gain. Next, the gain setting unit 42 ends the control in FIG. 4 without outputting an instruction signal for adding a duty ratio added value (step S28).

If it is determined in step S26 that the difference ΔV between the output voltage value Vout and the target voltage value Vta is not in the range of the second threshold value, in other words, the difference ΔV between the output voltage value Vout obtained in step S22 and the target voltage value Vta is larger than or equal to the second threshold value, the gain setting unit 42 outputs a gain change instruction signal so as to change the gain to be used, to the second gain (N in step S26, step S29). In the output voltage waveform shown in FIG. 5, for example, during the period from when driving of the DC-DC converter 1 is started until time t1, the difference ΔV between the output voltage value Vout and the target voltage value Vta is larger than or equal to the second threshold value, and thus, in a period before time t1, the gain setting unit 42 outputs a gain change instruction signal so as to change the gain to be used, to the second gain. After step S29, the gain setting unit 42 outputs an instruction signal for adding a duty ratio added value (step S30).

When performing the processing in step S30, the gain setting unit 42 calculates an added value based on an input voltage value Vin obtained in step S22 (namely, the input voltage value Vin detected in step S1), the target voltage value Vta, and an addition ratio α (a constant that is larger than 0 and smaller than 1). Specifically, the added value is calculated by multiplying the addition ratio α by the duty ratio value D that was calculated using a predetermined duty ratio calculation equation based on the target voltage value Vta and the input voltage value Vin, as an added value Xa (Xa=α×D). In the step-down mode, for example, in a current continuous mode, the value Xa is calculated based on Xa=α×Vta/Vin, as an added value. Also, in the step-down mode, in a current discontinuous mode, the value Xa is calculated based on Xa=α×(a/(Vin−b)+c)/Vta), as an added value. Note that a, b, and c are predetermined coefficients (constants). After the processing in step S30, the control in FIG. 4 is ended.

Figure 4:
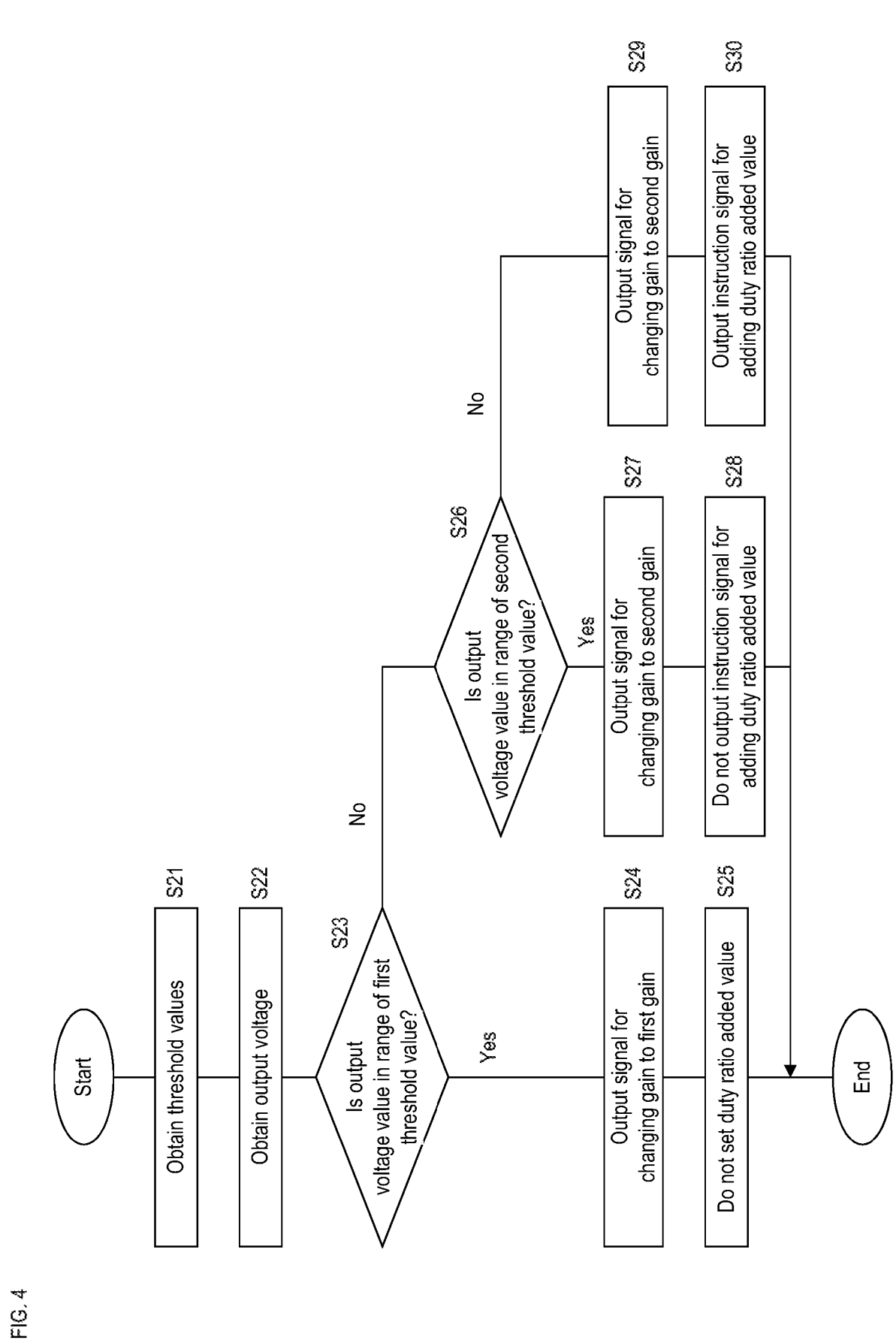
FIG. 4 is a flowchart illustrating determination processing that is performed by a determination unit of the DC-DC converter of the first embodiment.

After the determination processing as shown in FIG. 4, in step S4 shown in FIG. 3, a second computation unit 46 determines whether or not a gain change instruction signal has been output from the gain setting unit 42. If no gain change instruction signal has been output from the gain setting unit 42 (N in step S4), the second computation unit 46 selects the first gain (step S5), and, if a gain change instruction signal has been output from the gain setting unit 42 (Y in step S4), the second computation unit 46 selects the second gain (step S6). The first gain includes a first proportional gain and a first integral gain, and, if the first gain is selected in step S5, the first proportional gain is used as a proportional gain, and the first integral gain is used as an integral gain. Also, the second gain includes a second proportional gain and a second integral gain, and, if the second gain is selected in step S6, the second proportional gain is used as a proportional gain, and the second integral gain is used as an integral gain. Note that the second proportional gain takes a value larger than the value of the first proportional gain, and, for example, a value that is twice the value of the first proportional gain can be used. The second integral gain takes a value larger than the value of the first integral gain, and, for example, a value that is twice the value of the first integral gain can be used. Note that the values of the first proportional gain, the second proportional gain, the first integral gain, and the second integral gain can be stored in a storage unit (not illustrated) in advance, for example. In step S7, if the first gain is selected in step S5, the second computation unit 46 sets the first proportional gain and the first integral gain as gains to be used, and, if the second gain is selected in step S6, the second computation unit 46 sets the second proportional gain and the second integral gain as gains to be used.

After step S7, the first computation unit 45 performs current control computation (step S8), and the second computation unit 46 performs voltage control computation (step S9). In the processing in step S8, the first computation unit 45 obtains a deviation between the output current value Iout and the target current value Ita output from the deviation calculation circuit 43, and determines an operation amount (duty ratio increase/decrease amount) for approximating the output current to the target current value Ita, based on the obtained deviation, and preset proportional gain and integral gain, using a known PI computation equation. In the processing in step S9, the second computation unit 46 obtains the deviation between the output voltage value Vout and the target voltage value Vta output from the deviation calculation circuit 44, and determines an operation amount (duty ratio increase/decrease amount) for approximating the output voltage to the target voltage value Vta, based on the obtained deviation, and the proportional gain and integral gain set in step S7, using a known PI computation equation.

After step S9, an arbitration unit 47 (arbitration circuit) arbitrates current/voltage control (step S10). In this processing, the arbitration unit 47 determines whether to prioritize current control or voltage control. Specifically, the arbitration unit 47 determines whether to prioritize an operation amount determined by the first computation unit 45 or an operation amount determined by the second computation unit 46. Various methods for determining what is to be prioritized are conceivable, and, for example, a method for prioritizing a smaller operation amount from among the operation amounts determined by the computation units 45 and 46 is conceivable. Note that the arbitration method is not limited to this method, and another known method may also be used. The arbitration unit 47 (arbitration circuit) determines whether to prioritize the operation amount of the computation unit 45 or the computation unit 46 as described above, and then calculates a new duty ratio by adding the operation amount (duty ratio increase/decrease amount) that is prioritized, to the current control amount (duty ratio before being updated). After step S10, the addition unit 48 adds a duty ratio added value to the duty ratio calculated in step S10. Specifically, if an add instruction signal is output from the gain setting unit 42 in the processing in step S30, the addition unit 48 obtains, from the gain setting unit 42, the added value (duty ratio added value) determined in step S30, and adds the obtained added value to the duty ratio (calculated duty ratio) calculated in step S10. In this case, the addition unit 48 sets, as a duty ratio to be used, a duty ratio obtained by adding the added value supplied from the gain setting unit 42 to the duty ratio (calculated duty ratio) calculated in step S10 (step S12). On the other hand, if no add instruction signal has been output from the gain setting unit 42, the addition unit 48 does not perform additional-value addition processing, and, in this case, sets the duty ratio (calculated duty ratio) calculated in step S10 as a duty ratio to be used (step S12).

The control unit 12 outputs a PWM signal whose duty ratio is the duty ratio to be used set in step S12, to the drive unit 8, and, every time the addition unit 48 updates the duty ratio to be used, switches the duty ratio of a PWM signal that is output to the drive unit 8, to the updated duty ratio to be used, and the drive unit 8 outputs a PWM signal whose duty ratio is the same as the duty ratio of the PWM signal supplied from the control unit 12, using the above-described method.

Next, effects of this configuration will be illustrated.

The above-described in-vehicle DC-DC converter 1 can set a gain to be used, based on an output voltage value detected by the voltage detection unit 20, and thus can perform feedback computation using a gain that is based on an output voltage value when the voltage conversion unit 6 is actually performing voltage conversion.

If the difference between an output voltage value detected by the voltage detection unit 20 and a target voltage value is smaller than a predetermined threshold value (first threshold value), the gain setting unit 42 sets a first gain as a gain to be used, and if the difference between the output voltage value detected by the voltage detection unit 20 and the target voltage value is larger than or equal to the predetermined threshold value (first threshold value), the gain setting unit 42 sets a second gain that is larger than the first gain, as a gain to be used. With this configuration, when the voltage conversion unit 6 is actually performing voltage conversion, if the output voltage value and the target voltage value differ to a certain degree or larger, it is possible to increase the speed at which the difference between the output voltage value and the target voltage value is decreased, by performing feedback computation using the relatively large second gain, and the output voltage value can be approximated to the target voltage value faster. On the other hand, if the output voltage value and the target voltage value differ to a degree that is smaller than the certain degree, the output voltage value can be approximated to the target voltage value while suppressing overshoot and undershoot, by performing feedback computation using the relatively small first gain.

A configuration is adopted in which, when the computation unit 49 performs feedback computation, if the difference between the output voltage value detected by the voltage detection unit 20 and the target voltage value is larger than or equal to a second threshold value that is larger than the predetermined threshold value (first threshold value), the duty ratio determination unit 41 determines a duty ratio to be used, by adding an added value obtained through predetermined addition processing to a calculated duty ratio calculated through feedback computation that is based on the second gain, and, if the difference between the output voltage value detected by the voltage detection unit 20 and the target voltage value is larger than or equal to the predetermined threshold value (first threshold value) and smaller than the second threshold value, determines the calculated duty ratio calculated through feedback computation that is based on the second gain, as a duty ratio to be used. With this configuration, if the difference between the output voltage value and the target voltage value is larger (larger than or equal to the second threshold value), it is possible to use, in parallel, an operation of performing feedback computation using the relatively large second gain and an operation of adding an added value (a value obtained through predetermined addition processing) to a duty ratio and increasing the duty ratio. That is to say, if the difference between the output voltage value and the target voltage value is larger, it is possible to further increase the speed at which the difference between the output voltage value and the target voltage value is decreased.

Other Embodiments

The present disclosure is not limited to the embodiment described above with reference to the drawings. For example, the following embodiments are also included in the technical scope according to the present disclosure. Moreover, the various features in the embodiments described above and below may be freely combined unless such combined features are inconsistent with one another.

In the first embodiment, the duty ratio determination unit 41 determines a control amount (duty ratio) by performing feedback computation that is based on a PI control method, but may also perform feedback computation that is based on a PID control method. In this case, it suffices for the second computation unit 46 to use, as first gains, a first proportional gain, a first integral gain, and a first differential gain, and, as second gains, a second proportional gain that is larger than (e.g., twice as large as) the first proportional gain, a second integral gain that is larger than (e.g., twice as large as) the first integral gain, and a second differential gain that is larger than (e.g., twice as large as) the first differential gain, for example.

In the first embodiment, the added value (duty ratio added value) used in step S30 is calculated based on a predetermined computation equation, but may also be a fixed value stored in a storage unit (not illustrated) in advance.

In the first embodiment, a bidirectional step up/down DC-DC converter is described as an example of a DC-DC converter, but, in the first embodiment or any example obtained by modifying the first embodiment, a step-down DC-DC converter, a step-up DC-DC converter, or a step up/down DC-DC converter may also be used. Moreover, a bidirectional DC-DC converter that can make a switch between the input side and the output side as in the first embodiment may also be used, or a unidirectional DC-DC converter in which the input side or the output side are fixed may also be used.

In the first embodiment, a single-phase DC-DC converter is described as an example, but, in the first embodiment or any example obtained by modifying the first embodiment, a multiphase DC-DC converter may also be used.

In the first embodiment, a synchronous rectification DC-DC converter is described as an example, but, in the first embodiment or any example obtained by modifying the first embodiment, a diode DC-DC converter in which some switching elements are replaced with diodes may also be used.

In the first embodiment, the switching elements T1, T2, T3, and T4 configured as N-channel MOSFETs are described as switching elements of a DC-DC converter, but, in the first embodiment or any example obtained by modifying the first embodiment, a switching element may be a P-channel MOSFET or a different type of switching element such as a bipolar transistor.

In the first embodiment, the control unit 12 is constituted by a microcomputer and other hardware circuits, but the entirety of the control unit 12 may also be constituted by a microcomputer.

In the first embodiment, in step S30, an added value is calculated based on a predetermined computation equation, but the processing in step S30 may also be performed using a computation equation other than that in the first embodiment. A value Xa that is obtained using the target voltage value Vta and the output voltage value Vout based on Xa=(Vta−Vout)×e may also be determined as an added value, for example. Note that e is a predetermined coefficient (constant). With this configuration, an added value can be determined in accordance with the deviation between the target voltage value Vta and the output voltage value Vout.

The invention claimed is:

1. An in-vehicle DC-DC converter that is electrically connected to a first conductive path and a second conductive path, one of the first conductive path and the second conductive path being defined as an input-side conductive path and the other being defined as an output-side conductive path, steps up or down a voltage applied to the input-side conductive path, and outputs the voltage to the output-side conductive path, the in-vehicle DC-DC converter including:

a voltage conversion unit that includes a switching element that performs an on/off operation in accordance with being supplied with a PWM signal, the voltage conversion unit stepping up or down a voltage applied to the input-side conductive path, through an on/off operation by the switching element, and outputting the voltage to the output-side conductive path;

a voltage detection unit that detects a voltage value of the output-side conductive path;

a gain setting unit that sets a gain to be used for feedback computation;

a duty ratio determination unit that includes a computation unit that repeatedly performs feedback computation for calculating a duty ratio of the PWM signal so as to approximate a voltage value of the output-side conductive path to a target voltage value based on at least a voltage value detected by the voltage detection unit and the gain to be used set by the gain setting unit, and, every time the computation unit performs feedback computation, determines a duty ratio to be used, based on a calculated duty ratio calculated through the feedback computation; and a drive unit that outputs, to the switching element, a PWM signal that is based on the duty ratio to be used determined by the duty ratio determination unit, wherein the gain setting unit sets the gain to be used, based on a voltage value detected by the voltage detection unit.

2. The in-vehicle DC-DC converter according to claim 1, wherein, when a difference between a voltage value detected by the voltage detection unit and the target voltage value is smaller than a predetermined threshold value, the gain setting unit sets a first gain as the gain to be used, and, when the difference between the voltage value detected by the voltage detection unit and the target voltage value is larger than or equal to the predetermined threshold value, sets a second gain that is larger than the first gain, as the gain to be used.

3. The in-vehicle DC-DC converter according to claim 2, wherein, when the computation unit performs feedback computation, if the difference between the voltage value detected by the voltage detection unit and the target voltage value is larger than or equal to a second threshold value that is larger than the predetermined threshold value, the duty ratio determination unit determines a duty ratio to be used, by adding an added value obtained through predetermined addition processing to the calculated duty ratio calculated through feedback computation that is based on the second gain, and if the difference between the voltage value detected by the voltage detection unit and the target voltage value is larger than or equal to the predetermined threshold value and smaller than the second threshold value, the duty ratio determination unit determines the calculated duty ratio calculated through feedback computation that is based on the second gain, as the duty ratio to be used.

* * * * *